United States Patent

Diehl et al.

[11] Patent Number: 5,997,609
[45] Date of Patent: Dec. 7, 1999

[54] SPONGE IRON PRODUCTION PROCESS AND PLANT

[75] Inventors: Jörg Diehl, Linz; Gerald Rosenfellner, St. Peter/Au, both of Austria

[73] Assignee: Voest-Alpine Industrieanlagenbau GmbH, Linz, Austria

[21] Appl. No.: 08/849,227

[22] PCT Filed: Nov. 28, 1995

[86] PCT No.: PCT/AT95/00232

§ 371 Date: May 30, 1997

§ 102(e) Date: May 30, 1997

[87] PCT Pub. No.: WO96/17089

PCT Pub. Date: Jun. 6, 1996

[30] Foreign Application Priority Data

Dec. 1, 1994 [AT] Austria ................................. 2232/94

[51] Int. Cl.$^6$ .................................................. C21B 13/14
[52] U.S. Cl. ........................... 75/492; 266/144; 266/166
[58] Field of Search ................. 75/492; 266/144, 266/166

[56] References Cited

U.S. PATENT DOCUMENTS

| 1,800,856 | 4/1931 | Bradley . |  |
|---|---|---|---|
| 3,653,874 | 4/1972 | Schulte . |  |
| 5,238,487 | 8/1993 | Hauk et al. | 75/492 |
| 5,676,732 | 10/1997 | Viramontes-Brown et al. | 75/492 |

FOREIGN PATENT DOCUMENTS

| 376241 | 10/1984 | Austria . |
| 396255 | 7/1993 | Austria . |
| 010627 | 12/1981 | European Pat. Off. . |
| 269609 | 6/1988 | European Pat. Off. . |
| 487856 | 6/1992 | European Pat. Off. . |
| 571358 | 11/1993 | European Pat. Off. . |
| 252202 | 12/1987 | Germany . |
| 3716511 | 7/1989 | Germany . |
| 4004938 | 8/1990 | Germany . |
| 4037977 | 6/1992 | Germany . |
| 799551 | 8/1958 | United Kingdom . |

OTHER PUBLICATIONS

Patent Abstracts of Japan, vol. 2, No. 100 (C–020), Aug. 18, 1978 & JP–A–53 062718, Jun. 5, 1978.

Patent Abstracts of Japan, vol. 8, No. 222 (C–246), Oct. 9, 1984 & JP–A–59–107009, Jun. 21, 1984.

Patent Abstracts of Japan, vol. 10, No. 280 (C–374), Sep. 24, 1986 & JP–A–61–009613, May 17, 1986.

Patent Abstracts of Japan, vol. 940, No. 010 & JP–A–06 287001, Oct. 11, 1994.

*Primary Examiner*—Melvyn Andrews
*Attorney, Agent, or Firm*—Ostrolenk, Faber, Gerb & Soffen, LLP

[57] ABSTRACT

In a process for producing sponge iron from particulate iron oxide-containing material, the iron oxide-containing material in a reduction zone is reduced to sponge iron by means of reducing gas and the gas forming during reduction is withdrawn as top gas. In order to provide for an efficient way of utilization of the top gas, the top gas is subjected to $CO_2$ purification, $CO_2$-containing offgas separated in the purification is mixed with an oxygen-containing gas and is burnt, and the resulting thermal energy is supplied to a consumer.

18 Claims, 1 Drawing Sheet

SPONGE IRON PRODUCTION PROCESS AND PLANT

The invention relates to a process for producing sponge iron from particulate iron-oxide-containing material, wherein the iron-oxide-containing material in a reduction zone is reduced to sponge iron by means of reducing gas and the gas forming during reduction is withdrawn as top gas, as well as to a plant for carrying out the process.

With a process of this type known, for instance, from EP-B-0 010 627, from DE-C-40 37 977 and from AT-B-376,241, the sponge iron formed by the direct reduction is smelted in a meltdown gasifying zone under supply of lumpy carbon carriers and oxygen-containing gas, wherein a fluidized bed is formed in the meltdown gasifying zone from the lumpy carbon carriers and by blowing in oxygen-containing gas, in which fluidized bed the sponge iron particles top-charged into the meltdown gasifiying zone are braked and melted. In doing so, a reducing gas containing CO and $H_2$ is produced, which is injected into the reduction zone and reacted there.

During this reaction, a large amount of top gas incurs, which still has a considerable content of carbon monoxide and hydrogen. If utilization of this top gas is feasible in an economic manner, production costs for sponge iron and pig iron melted therefrom or steel pre-products produced therefrom will be very low.

It is known (DE-C-40 37 977) to supply top gas escaping from the reduction zone to a further reduction zone for reducing additional iron-oxide-containing material after having been subjected to purification. The treatment of top gas, in general, is effected by initially purifying the same from solids particles in a scrubber while being strongly cooled. After this, the $CO_2$ contained in the top gas is eliminated, because this would impede further utilization of the top gas as a reducing gas. Various methods have been known for the purification of top gas from $CO_2$, for instance, the pressure-swing process or chemical $CO_2$-scrubbing.

According to DE-C-40 37 977, it has been possible to utilize the energy chemically bound in the top gas to a major extent Yet, this involves the problem of $CO_2$-containing offgas incurring in the purification of top gas, which offgas has to be disposed of in an environmentally safe manner.

This offgas, i.a., contains CO, $H_2$, $CH_4$ as well as $H_2S$ and, as a result, cannot be released to the environment in such state for reasons of environmental protection. For this reason, it is suited for further processing also to a limited degree only. Consequently, the sulfur compounds usually are eliminated from the offgas. So far, such desulfurization has been carried out by means of various methods, such as, for instance, by what is called "Stretford scrubbing" or by catalytic oxidation on activated carbon, etc. From DE-B-37 16 511 it is known to remove $H_2S$ from $CO_2$-containing offgas in a desulfuization reactor by aid of sponge iron. All of these methods are expensive, requiring additional materials, such as activated carbon or absorbants, which, i.a., must be stored and disposed of separately.

It is internally known to bleed off $CO_2$-containing offgas. However, such bleeding off involves the provision of combustible supporting gas as ignition and carburizing gas, since the calorific value of the $CO_2$-containing offgas is only low.

From EP-A-0 571 358 it is known to subject top gas incurring in the direct reduction of fine ore by aid of a reducing gas formed of reformed natural gas to $CO_2$-scrubbing and to admix the thus purified top gas to fresh reducing gas obtained from natural gas by reforming and to introduce this gas mixture into the reduction zone. Again, this involves the problem of disposing of the $CO_2$-containing offgas incurring in the purification of the top gas, although this offgas, due to the production of the reducing gas from reformed natural gas, has a lower $H_2S$-content than the offgas incurring in the top-gas purification of reducing gas obtained from lumpy carbon carriers.

The invention aims at avoiding these disadvantages and difficulties and has as its object to provide for an efficient way of utilization of the top gas incurring in the reduction of ore, such as a direction reduction for producing sponge iron, by overcoming the difficulties involved in the prior art. In particular, $CO_2$-containing offgas not only is to be processed and disposed of in an environmentally safe manner, but also is to be utilized energetically to the highest degree possible. Furthermore, problems involved in the separation of $H_2S$, which takes place simultaneously with the separation of $CO_2$, likewise are to be solved in an environmentally safe manner.

In accordance with the invention, this object is achieved with a process of the initially defined kind by the combination of the following measures:

that the top gas is subjected to $CO_2$ purification, that $CO_2$-containing offgas separated in $CO_2$ purification is mixed with an oxygen-containing gas and is burnt, and that its thermal energy is supplied to a consumer.

According to the invention, it is feasible to completely utilize the caloric content of the $CO_2$-containing offgas even though its energy content is not very high, without thereby affecting the environment.

Preferably, the $CO_2$-containing offgas is burnt at least partially while indirectly giving off heat to reducing gas, whereupon particulate iron-oxide-containing material is reduced by means of the heated reducing gas.

A particular advantage of the invention is to be seen in that the $CO_2$-containing offgas separated from the top gas of a reduction process at least for the major part again is energetically beneficial to a reduction process, which reduction process may be a reduction process in addition to the reduction process forming the top gas or is identical with the same, which means that at least a portion of the top gas purified from $CO_2$ may be recycled as a reducing gas or an admixture to the reducing gas, to the reduction process in which it has incurred as top gas (which is known, for instance, from DE-B-37 16 511).

According to a preferred embodiment, the $CO_2$-containing offgas separated in $CO_2$ purification additionally is mixed with a combustible gas.

Preferably, at least a portion of the top gas forming in a reduction, such as a direct reduction, of particulate iron-oxide-containing material by means of reducing gas is employed as a combustible gas. Thereby, it is feasible to ensure heating up of the reducing gas to reduction temperature without using a foreign gas (except for the supply of an $O_2$-containing gas, such as air).

Preferably, the top gas subjected to $CO_2$ purification is formed in a first reduction zone and the top gas purified from $CO_2$, after heating, is used as a reducing gas in at least one further reduction zone for reducing further particulate iron-oxide-containing material, being reacted there. Due to these measures, it is possible to utilize the reducing gas formed in a large amount from lumpy carbon carriers in a meltdown gasifying zone, for the production of amounts of sponge iron as large as possible to an optimum degree after reaction in the reduction zone, after which it still has a considerable content of carbon monoxide and hydrogen.

In doing so, top gas formed in the second reduction zone suitably at least partially is admixed as a combustible gas to $CO_2$-containing offgas separated in $CO_2$ purification and is burnt while indirectly giving off heat to the reducing gas fed to the second reduction zone.

Advantageously, the reduction or elimination of $CO_2$ is effected by means of the pressure swing adsorption process. This process is particularly advantageous if top gas having only a slight pressure incurs, because the vapor consumption for chemical scrubbing will increase enormously at a low pressure. When producing reducing gas from reformed natural gas, chemical scrubbing is recommended for $CO_2$ removal.

Preferably, sponge iron from the first reduction zone is smelted in a meltdown gasifying zone while supplying solid carbon carriers and oxygen-containing gas, thus forming a CO- and $H_2$-containing reducing gas to be injected into the first reduction zone and reacted there.

A plant for carrying out the process, which comprises a reduction shaft furnace for particulate iron-oxide containing material including a supply duct for reducing gas as well as a discharge duct for top gas, is characterized in that the top-gas discharge duct runs into a $CO_2$ purification means, from which a reducing-gas supply duct departs, conducting the $CO_2$-purified top gas to a reduction shaft furnace via a heating means for the $CO_2$-purified top gas, and that an offgas duct departs from the $CO_2$ purification means, leading separated $CO_2$-containing offgas to a heating means, a duct conducting an oxygen-containing gas to the heating means running into the offgas duct.

A preferred embodiment is characterized in that an offgas duct departs from the $CO_2$ purification means, conducting separated $CO_2$-containing offgas at least partially to a heating means, a combustion-gas duct conducting a combustible gas to the heating means running into the offgas duct.

To utilize for the reduction process the energy contained in the $CO_2$-containing offgas, the heating means into which the offgas duct conducting the $CO_2$-containing offgas runs advantageously is designed as an indirect heating means for heating $CO_2$-purified top gas, the reducing-gas supply duct conducting this top gas running into the heating means.

In order to render feasible the combustion of the $CO_2$-containing offgas without any foreign gas, the combustion-gas duct suitably departs from a reduction shaft furnace, at least partially receiving the top gas incurring in the reduction shaft furnace.

According to a preferred embodiment, two reduction shaft furnaces are provided, which are flow-connected via the top-gas discharge duct of the first reduction shaft furnace, via the $CO_2$ purification means and via the reducing-gas supply duct departing therefrom and leading through the heating means.

In this case, the combustion-gas duct suitably departs from the second reduction shaft furnace.

A preferred embodiment is characterized by a melter gasifier, into which a conveying duct conveying the sponge iron from the first reduction shaft furnace runs and which comprises supply ducts for oxygen-containing gases and for solid carbon carriers as well as taps for pig iron and slag and from which a supply duct for reducing gas formed in the melter gasifier departs, running into the first reduction shaft furnace.

Preferably, the gas purification means is designed as a pressure swing adsorption plant.

Suitably, an offgas duct carrying off separated $CO_2$-containing offgas runs into a heating means designed as a steam generator.

Preferably, an offgas duct carrying off separated $CO_2$-containing offgas runs into a heating means the smoke gases of which may be carried off via a smoke-gas discharge duct comprising a heat exchanger, wherein material to be heated, such as coal, ore, etc., may be directly contacted with the smoke gas in the heat exchanger.

Another preferred embodiment is characterized in that an an offgas duct carrying off separated $CO_2$-containing offgas is conducted via a heat exchanger provided in the top-gas discharge duct of a reduction shaft furnace and subsequently runs into a heating means.

DETAILED DESCRIPTION OF THE INVENTION

Figure 1:
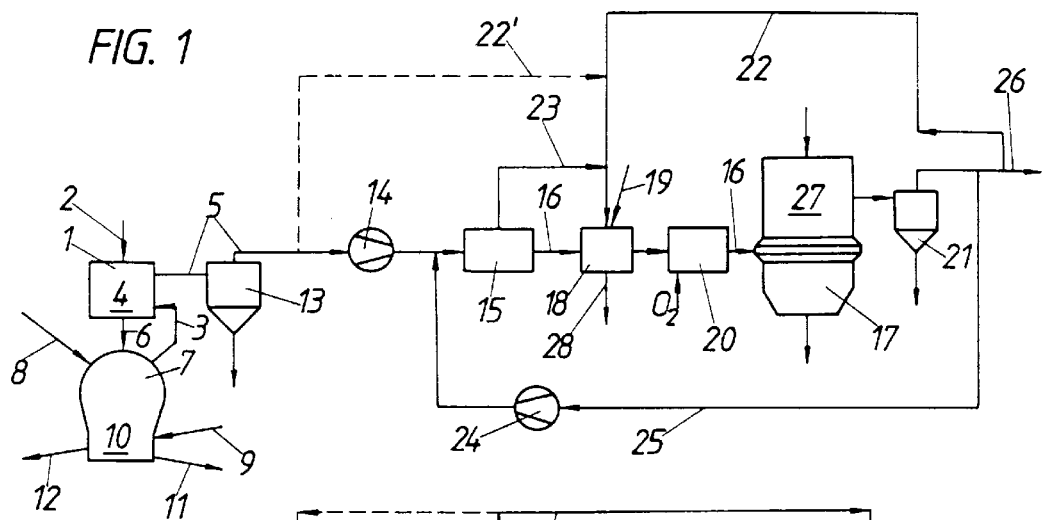
FIGS. 1, 2 and 3 are each block diagrams illustrating different embodiments of this invention.
Figure 2:
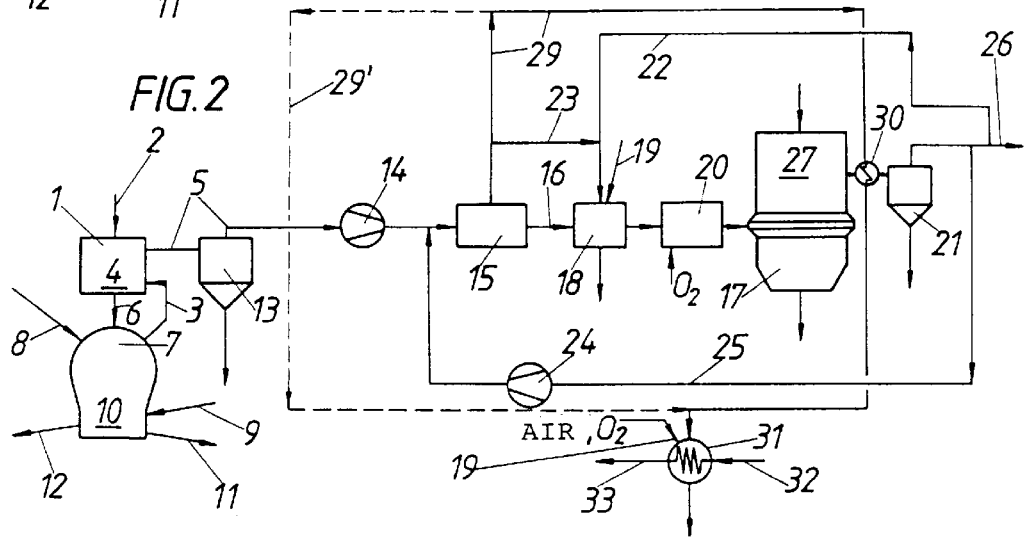
Figure 3:
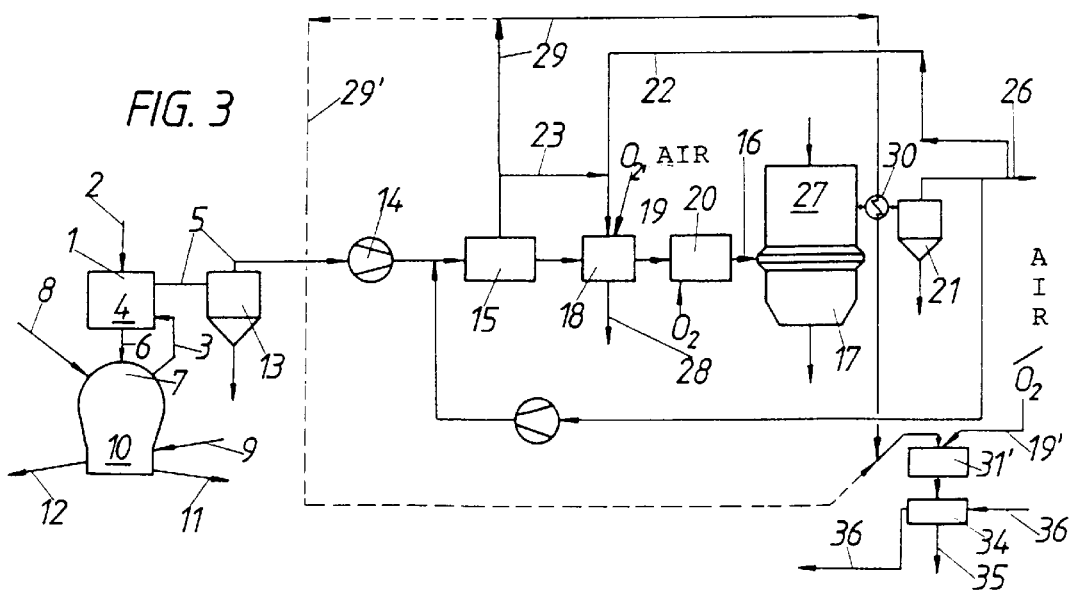

According to FIGS. 1 to 3, particulate iron-oxide material, preferably lumpy iron ore, and possible fluxes are supplied to a first reduction shaft furnace 1 through a duct 2 in a known manner. Reducing gas is blown into the reduction shaft furnace through a supply duct 3, ascending in counterflow to the descending iron ore and affecting the reduction of the charge in the reduction zone 4. After having streamed through the shaft furnace 1, this gas is carried off as a top gas via a top-gas discharge duct 5.

The reduced burden, which contains iron in the form of sponge iron, gets into a melter gasifier 7 via conveying ducts preferably designed as downpipes 6. Via a duct 8, a lumpy carbon carrier, for instance, in the form of brown-coal high-temperature coke, as well as, if desired, coal, and, in addition, via a duct 9 an oxygen-containing gas, are supplied to the melter gasifier 7 in a known manner.

Thereby, the burden or sponge iron, respectively, falls from top of the meltdown gasifying zone 10 onto a fluidized bed or a whirling bed, respectively, which is formed by the lumpy carbon carriers and is maintained by the oxygen-containing gas blown in. Due to the combustion of coke as well as, if desired, of coal under the influence of the oxygen-containing gas, so much heat is produced in the fluidized bed or in the whirling bed, respectively, that the sponge iron will melt. In the melted state, it is completely reduced by the carbon such that a pig iron melt collects on the bottom of the melter gasifier 7. A slag melt forms above the pig iron melt. These two melts are drawn off through appropriately arranged taps 11, 12 at predetermined time intervals.

During the combustion of coke and, if desired, of coal in the melter gasifier, a reducing gas essentially consisting of CO and $H_2$ is produced, which is withdrawn from the melter gasifier 7 through supply duct 3 and is supplied to the reduction shaft furnace 1. Purification and cooling of the reducing gas formed in the melter gasifier to the temperature required for reduction is effected in a manner known per se, which, however, is not illustrated in detail in the drawing.

The top gas drawn off through the top-gas discharge duct 5 at first is subjected to purification, for instance, in a cyclone 13 or in a scrubber in order to free it from dust particles. Subsequently, the top gas reaches a $CO_2$ purification means 15 by aid of a condenser 14, in which $CO_2$ purification means it is freed from $CO_2$ and, at the same time, from $H_2S$. The purification means 15 is designed as a pressure swing adsorption plant In this case, $H_2O$ is removed, too. The thus purified top gas, through a reducing-gas supply duct 16, is fed to a second reduction shaft furnace 17 likewise operating according to the counterflow principle as the first reduction shaft furnace 1. In this shaft furnace 17 particulate ore is directly reduced.

Since the top gas has been strongly cooled in the course of purification, it is reheated prior to being introduced into the second reduction shaft furnace 17. Heating is effected in two stages: At first, the purified top gas is subjected to indirect heating in a first stage, the heating means 18 serving this purpose being designed as a heat exchanger. The heat exchanger (recuperator) 18 is operated by means of a mixture of $CO_2$-containing offgas separated in the $CO_2$ purification means 15 and of purified top gas drawn off the second reduction shaft furnace 17. In addition, oxygen-containing gas (oxygen being present in molecular form), such as air, is fed to the burner of the heat exchanger 18 through a duct 19. Subsequently, the heated purified top gas is subjected to afterburning in a secondary heating means 20, in which a portion of the purified top gas is burnt under oxygen supply. Thereby, the purified top gas reaches the temperature required for the reduction in the second reduction shaft furnace, which temperature ranges between 700 and 900° C.

The top gas drawn off the reduction shaft furnace 17 likewise is subjected to purification and cooling (top gas scrubber 21) in order to purify the same from dust particles and to lower its vapor content. After this, a portion of the purified top gas is fed to the heat exchanger 18 through a combustion gas duct 22 running together with an offgas duct 23 discharging the $CO_2$-containing offgas from the $CO_2$ purification means. The other portion of the top gas incurring in the second reduction shaft furnace 17 is fed to the $CO_2$ purification means 15 via a condenser 24 through a conveying duct 25 running into the top-gas discharge duct 5, then likewise being available to the $CO_2$ removing means 15 and, after this, as a reducing gas to be recycled. The portion of the top gas of the reduction shaft furnace 17 that is not required for the process according to the invention is supplied to other purposes of use as an export gas through an export gas duct 26. A branch duct branching off the offgas duct 23 also may enter into this export gas duct 26, admixing a portion of the $CO_2$-containing offgas to the export gas unless required in the heat exchanger 18.

A substantial advantage of the invention is to be seen in that the combustion gas prepared by mixing $CO_2$-containing offgas and top gas from the second reduction shaft furnace 17 has a low adiabatic combustion temperature. The smoke gas temperature in front of the heat exchanger bundles of the heat exchanger 18 is adjusted by the volume ratio of $CO_2$-containing offgas/top gas and/or oxygen-containing gas. Smoke gas recycling as would be required for temperature adjustment if only top gas were used as fuel for the heat exchanger 18 can be obviated. The smoke gas formed in the heat exchanger 18 is carried away in a purified state through a smoke-gas discharge duct 28 in a usual manner. Unless the total energy of the $CO_2$-containing offgas, or of the mixture of this offgas with top gas, respectively, is required for heating the reducing gas, it will be suitable to admix the non-required portion of the offgas or the mixture of offgas and top gas, respectively, to the export gas.

The combustion gas fed to the heating means 18 also may be formed by $CO_2$-containing offgas and a heating gas, such as natural gas, etc., or by $CO_2$-containing offgas and top gas derived from the first reduction zone 4 and supplied through duct 22' illustrated in broken lines in FIG. 1.

Due to the $CO_2$-containing offgas being used in the heat exchanger 18, the energy content of this offgas is still utilized. The $CO_2$-containing offgas, thus, replaces a portion of the top gas, which, in turn, may be used for other purposes. Another advantage is to be seen in that higher limiting values are permitted for the $SO_2$ formed by burning of the $CO_2$-containing offgas than are permitted for the $H_2S$ present in the unburnt $CO_2$-containing offgas. Therefore, the use of such $CO_2$-containing offgas is feasible without being harmful to the environment. If the $SO_2$-content is still too high, smoke gas desulfurization according to the prior art is recommended. However, the components CO, $H_2$ and $CH_4$ have been completely converted to such an extent that any possible residual content will lie far below the permissible limiting values.

According to the exemplary embodiment explained in more detail by way of Tables 1 to 4 below, the $CO_2$-containing offgas incurring in $CO_2$ purification is mixed with top gas derived from the second reduction zone 27.

In Table 1 below, the chemical composition of the $CO_2$-containing offgas formed in the $CO_2$ purification of the top gas incurring in the first reduction zone 4 is represented.

TABLE 1

| | |
|---|---|
| CO | 11.8% vol. |
| $CO_2$ | 80.3% vol. |
| $H_2$ | 1.5% vol. |
| $H_2O$ | 5.3% vol. |
| $N_2$ | 0.7% vol. |
| $CH_4$ | 0.4% vol. |
| $H_2S$ max. | 0.03% vol. |
| $kJ/Nm^3$ | 1,795 |

Table 2 depicts the chemical composition of the purified and cooled top gas derived from the second reduction zone 27 of the second reduction shaft furnace 17 before being mixed with the $CO_2$-containing offgas.

TABLE 2

| | |
|---|---|
| CO | 43.2% vol. |
| $CO_2$ | 25.4% vol. |
| $H_2$ | 18.0% vol. |
| $H_2O$ | 5.7% vol. |
| $N_2$ | 6.2% vol. |
| $CH_4$ | 1.5% vol. |
| $H_2S$ max. | 0.00% vol. |
| $kJ/Nm^3$ | 1,945 |

Table 3 indicates the chemical composition of the mixture of top gas and $CO_2$-containing offgas, which is burnt in the heat exchanger 18.

TABLE 3

| | |
|---|---|
| CO | 16.6% vol. |
| $CO_2$ | 72.0% vol. |
| $H_2$ | 4.0% vol. |
| $H_2O$ | 5.3% vol. |
| $N_2$ | 1.5% vol. |
| $CH_4$ | 0.6% vol. |
| $H_2S$ max. | 0.02% vol. |
| $kJ/Nm^3$ | 2,725 |

The chemical composition of the smoke gas formed in the heat exchanger 18 during the combustion of this gas mixture is represented in Table 4 below.

TABLE 4

| | |
|---|---|
| $CO_2$ | 60.1% vol. |
| $H_2O$ | 7.9% vol. |
| $O_2$ | 0.4% vol. |
| $N_2$ | 31.6% vol. |
| $SO_2$ | 0.02% vol. |

The adiabatic combustion temperature lies at 984° C.

In Tables 5 and 6 below, an exemplary embodiment is represented, according to which the $CO_2$-containing offgas formed in the $CO_2$ purification of the top gas incurring in the first reduction zone 4 (Table 5) merely is mixed with oxygen and burnt. Since in that case the gas fed to the heat exchanger 18 merely is comprised of $CO_2$-containing offgas and oxygen (or an oxygen-containing gas), it may be necessary to supply ignition burners (socalled pilot burners) of the heat exchanger 18 separately with top gas, natural gas or any other combustion gas, which, however, is of no importance because of the slight amounts required therefor. This—and also the calorific value of the gas mixture for the heat exchanger 18—i.a. depends on the an operating characteristics of the $CO_2$-purification plant, i.e., on the amount of reductants incurring to an elevated degree if no strong separation of $CO_2$ is effected in the $CO_2$-purification plant.

TABLE 5

| | |
|---|---|
| CO | 11.8% vol. |
| $CO_2$ | 80.3% vol. |
| $H_2$ | 1.5% vol. |
| $H_2O$ | 5.3% vol. |
| $N_2$ | 0.7% vol. |
| $CH_4$ | 0.4% vol. |
| $H_2S$ max. | 0.03% vol. |
| $kJ/Nm^3$ | 1,795 |

The chemical composition of the smoke gas is indicated in Table 6.

TABLE 6

| | |
|---|---|
| $CO_2$ | 91.2% vol. |
| $H_2O$ | 7.6% vol. |
| $O_2$ | 0.4% vol. |
| $N_2$ | 0.7% vol. |
| $SO_2$ | 0.03% vol. |

The adiabatic combustion temperature lies at 867° C.

According to the process variant illustrated in FIG. 2, a portion of the $CO_2$-containing offgas is supplied through an offgas duct 29 branching off the offgas duct 23, via a heat exchanger 30 in which the $CO_2$-containing offgas is heated by means of the top gas leaving the second reduction shaft furnace 17, to a heating means 31 in which it is burnt under supply of oxygen of an oxygen-containing gas or of air as oxygen carrier gas. In this heating means 31, steam may, for instance, be produced in a recuperative manner; the water supply is denoted by 32 and the steam discharge is denoted by 33. A portion of the $CO_2$-containing offgas—or even the total amount of this offgas—may be fed to the heating means 31 directly through the offgas duct 29' illustrated in broken lines in FIG. 2 without being conducted through the heat exchanger 30.

According to FIG. 3, the $CO_2$-containing offgas is burnt in the heating means 31', coal or ore conveyed in and off via conveying means 36 being directly heated in a preheating chamber 34 by means of the offgas formed. The cooled smoke gas is conducted away via a smoke-gas discharge duct 35.

As is apparent from FIGS. 2 and 3, the energy inherent in the $CO_2$-containing offgas may be utilized in different ways, also by combining several types of utilization, such that the utilization of energy can be realized in an optimum manner depending on the mode of operation of the reduction shaft furnaces 1 and 17 and on the use of the export gas supplied to consumers via duct 26. It is, for instance, also possible to do without heating of the reducing gas fed to the reduction shaft furnace 17 through the reducing-gas supply duct 16 if the required reducing gas temperature can be reached merely by afterburning.

We claim:

1. A process for producing sponge iron from particulate iron-oxide-containing material, wherein the iron-oxide-containing material in a reduction zone is reduced to a sponge iron by a means of reducing gas and the gas forming during reduction is withdrawn as top gas, said process comprising:

subjecting the top gas to $CO_2$ purification, mixing at least a portion of the $CO_2$-containing offgas separated in the $CO_2$ purification with an oxygen-containing gas, combusting the resulting mixture to provide thermal energy, and supplying the thermal energy to a consumer.

2. A process according to claim 1, characterized in that the $CO_2$-containing offgas is burnt at least partially while indirectly giving off heat to said reducing gas.

3. A process according to claim 1, characterized in that the $CO_2$-containing offgas separated in $CO_2$ purification additionally is mixed with a combustible gas.

4. A process according to claim 2, characterized in that the top gas subjected to $CO_2$ purification is formed in a first reduction zone and the top gas purified from $CO_2$, said purified top gas being heated and then used as a reducing gas in at least one further reduction zone for reducing further particulate iron-oxide-containing material.

5. A process according to claim 4, characterized in that top gas formed in the further reduction zone at least partially is admixed as a combustible gas to $CO_2$-containing offgas separate in the $CO_2$ purification and is burnt while indirectly giving off heat to the reducing gas fed to said further reduction zone.

6. A process according to claim 1, characterized in that $CO_2$ purification of the top gas is effected by pressure swing adsorption.

7. A process according to claim 4, characterized in that sponge iron formed in the first reduction zone is smelted in a meltdown gasifying zone while supplying solid carbon carriers and oxygen-containing gas, thus forming a CO- and $H_2$-containing reducing gas and injecting said reducing gas into the first reduction zone and reacting it there.

8. A plant for the production of sponge iron from particulate iron-oxide material, comprising a reduction shaft furnace for particulate iron-oxide containing material including a supply duct for reducing gas as well as a discharge duct for top-gas, characterized in that the top-gas discharge duct runs into a $CO_2$ purification means, from which a reducing-gas supply duct departs, conducting the $CO_2$-purified top gas to a reduction shaft furnace via a heating means, for the $CO_2$-purified top gas, and that an offgas duct departs from the $CO_2$ purification means, leading separated $CO_2$-containing offgas to a heating means, a duct for conducting an oxygen-containing gas to the heating means running into the offgas duct.

9. A plant according to claim 8, characterized in that an offgas duct departs from the $CO_2$ purification means, conducting separated $CO_2$-containing offgas at least partially to a heating means a combustion-gas duct for conducting a combustible gas to the heating means running into the offgas duct.

10. A plant according to claim 8, characterized in that the heating means into which the offgas duct conducting the $CO_2$-containing offgas runs is an indirect heating means for heating $CO_2$-purified top gas, the reducing-gas supply duct for conducting this top gas running into the heating means.

11. A plant according to claim 9, characterized in that the combustion-gas duct departs from a reduction shaft furnace, and is adapted for at least partially receiving the top gas incurring in the reduction shaft furnace.

12. A plant according to claim 8, characterized in that two reduction shaft furnaces are provided, which are flow-connected via the top-gas discharge duct of the first reduction shaft furnace, via the $CO_2$ purification means and via the reducing-gas supply duct departing therefrom and leading through the heating means.

13. A plant according to claim 12, characterized in that the combustion-gas duct departs from the second reduction shaft furnace.

14. A plant according to claim 13, characterized by a melter gasifier, into which a conveying duct for conveying the sponge iron from the first reduction shaft furnace runs and which comprises supply ducts for oxygen-containing gases and for solid carbon carriers as well as taps for pig iron and slag and from which a supply duct for reducing gas formed in the melter gasifier departs, running into the first reduction shaft furnace.

15. A plant according to claim 8, characterized in that the gas purification means is a pressure swing adsorption plant.

16. A plant according to claim 8, characterized in that an offgas duct for carrying off separated $CO_2$-containing offgas runs into a heating means comprising a steam generator.

17. A plant according to claim 8, characterized in that an offgas duct carrying off separated $CO_2$-containing offgas runs into a heating means the smoke gases of which may be carried off via a smoke-gas discharge duct comprising a heat exchanger wherein material to be heated may be directly contacted with the smoke gas in the heat exchanger.

18. A plant according to claim 8, characterized in that an offgas duct carrying off separated $CO_2$-containing offgas is conducted via a heat exchanger provided in the top-gas discharge duct of a reduction shaft furnace and subsequently runs into a heating means.

\* \* \* \* \*